United States Patent [19]

Frieden et al.

[11] Patent Number: 5,044,895
[45] Date of Patent: Sep. 3, 1991

[54] OIL SUPPLY DEVICE FOR A ROTARY MACHINE

[75] Inventors: Peter Frieden; Heinz Frings, both of Cologne; Karl-Heinz Ronthaler, Zülpich, all of Fed. Rep. of Germany

[73] Assignee: Leybold Aktiengesellschaft, Cologne, Fed. Rep. of Germany

[21] Appl. No.: 810,379

[22] Filed: Dec. 18, 1985

[30] Foreign Application Priority Data

Dec. 22, 1984 [DE] Fed. Rep. of Germany ....... 3447193

[51] Int. Cl.$^5$ ............................................. F04B 17/00
[52] U.S. Cl. ................................................. 417/354
[58] Field of Search ....................... 417/352, 353, 354; 415/89; 184/31

[56] References Cited

U.S. PATENT DOCUMENTS 3,318,644  5/1967  Johnson ................................ 415/89
4,549,861  10/1985  Blam ..................................... 415/89

Primary Examiner—Louis J. Casaregola
Assistant Examiner—T. S. Thorpe
Attorney, Agent, or Firm—Spencer & Frank

[57] ABSTRACT

An oil supply device has a reservoir adapted to contain oil having a predetermined oil level; a drive shaft extending into the reservoir; a disc affixed to the shaft and being arranged to be submerged at least partially in the oil contained in the reservoir; and a trough affixed to the disc for rotation therewith as a unit. The trough extends arcuately and is radially inwardly open as viewed relative to the disc. Further, the trough is arranged to be submerged at least partially in the oil contained in the reservoir. There is also provided an oil conduit having a stationarily supported terminal portion accommodated in the reservoir and projecting into the trough. The oil conduit is provided with an open end situated in the trough and oriented opposite an operational rotary direction of the disc, whereby oil is driven into the terminal portion through the open end from the trough upon rotation of the drive shaft to supply oil under pressure in the oil conduit.

19 Claims, 4 Drawing Sheets

OIL SUPPLY DEVICE FOR A ROTARY MACHINE

BACKGROUND OF THE INVENTION

This invention relates to an oil supply device for use, for example, in a rotary machine, such as a vacuum pump, particularly a rotary piston pump (Roots pump) wherein the pump drive shaft has a terminal stub which extends into a chamber partially filled with oil.

An oil supply device of the above-outlined type is disclosed in published PCT application No. WO83/04075. The oil supply device is constituted by a self-drawing lateral channel pump. It is a disadvantage of this arrangement that a pump of this type has a relatively high input energy requirement and further, displacement pumps are not particularly suitable for operation in vacuum, because they require a relatively high intake level in vacuum and they entrain gas bubbles because of the frequent presence of foam in the oil chamber due to pressure fluctuations. The result is cavitation which not only leads to a noisy operation but may cause damages as well.

SUMMARY OF THE INVENTION

It is an object of the invention to provide an improved oil supply device in a rotating machine which has a simplified construction and yet is void of the above-outlined disadvantages.

This object and others to become apparent as the specification progresses, are accomplished by the invention, according to which, briefly stated, the oil supply device comprises a disc which is affixed to a drive shaft stub and which dips into the oil accommodated in a lateral chamber (such as the gear chamber of a vacuum pump) and which has a radially inwardly open peripheral trough. A stationary oil intake pipe of an oil supply conduit projects into the trough in such a manner that the opening of the intake pipe is oriented in the direction opposite the direction of rotation of the disc.

An oil supply device as outlined above has the advantage that it requires only a low intake level and operates in a satisfactory manner when installed either horizontally or vertically. Its operation is not affected adversely by the presence of foam in the oil, because the trough, by virtue of the centrifugal forces, takes only oil with the exclusion of foam. It is a further advantage of the invention that the disc may be mounted directly on the drive shaft stub, and thus, gear connections for the oil supply device may be dispensed with.

The oil supply device according to the invention drives oil in the oil supply conduit with a pressure of up to 2 bar. Thus, in a vacuum pump, the oil driven by the oil supply device according to the invention may be used for lubricating gears, bearings and slide ring seals at the exhaust chamber, and/or for lubricating, for example, the pump driving motor.

DESCRIPTION OF THE PREFERRED EMBODIMENTS

Figure 1:
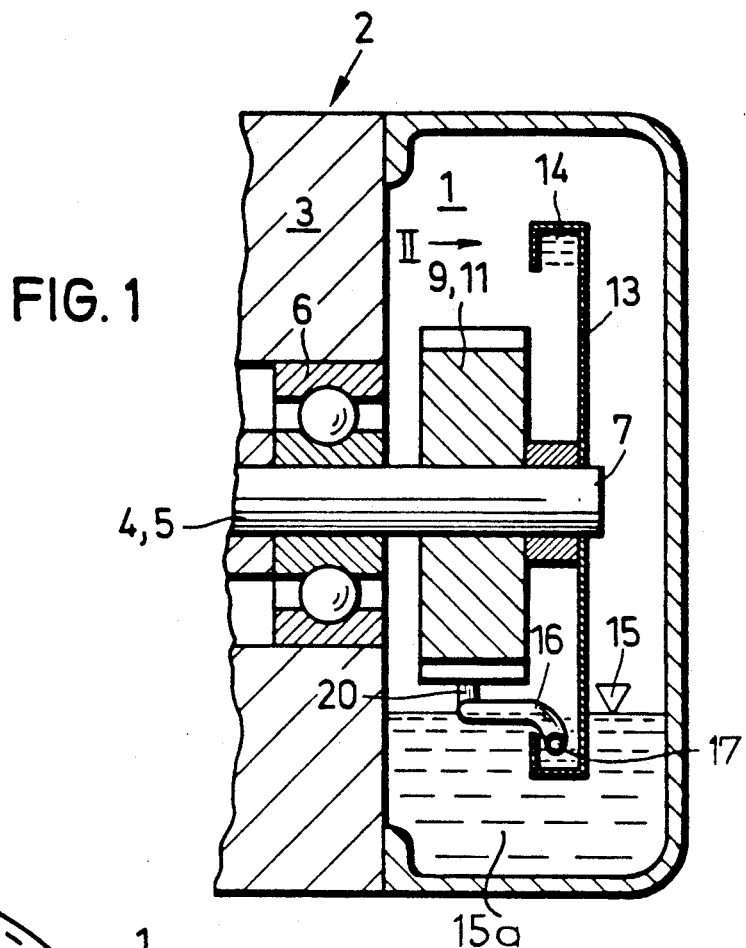
FIG. 1 is a sectional elevational view of a preferred embodiment of the invention.
Figure 2:
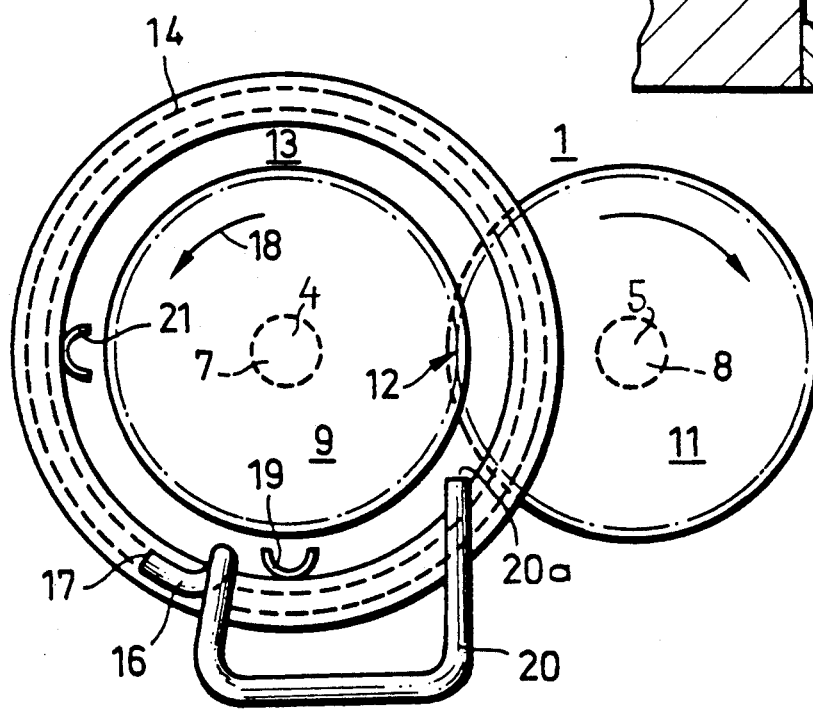
FIG. 2 is a schematic end elevational view taken in the direction of arrow II of FIG. 1.

Turning now to FIGS. 1 and 2, there is shown a lateral gear chamber 1 of a Roots vacuum pump 2 which has a housing wall 3 separating the gear chamber 1 from the exhaust chamber (not shown) of the vacuum pump. The gear chamber 1 also functions as a reservoir for accommodating an oil bath 15a having a level 15. Shafts 4 and 5 associated with respective cooperating rotary pistons (not shown) of the pump pass through the housing 3 and are supported therein by respective bearings 6 (only one shown in FIG. 1). Between the bearings 6 and the exhaust chamber of the vacuum pump conventional seals (such as labyrinth seals) are provided to ensure a fluidtight separation of the gear chamber 1 from the exhaust chamber.

On the stubs 7 and 8 of the respective shafts 4 and 5 there are mounted respective spur gears 9 and 11 which are in a meshing relationship at 12.

To the shaft stub 7 there is affixed a disc 13 which has a radially inwardly open circumferential trough 14 whose base runs along the outer periphery of the disc 13. The diameter of the disc 13 is so selected that a portion thereof dips below the oil level 15 of the oil bath 15a to permit oil to enter that portion of the trough 14 which is momentarily submerged in oil.

A stationary intake pipe 16 projects into the trough 14 such that the terminal opening 17 of the intake pipe 16 is oriented opposite to the rotary direction 18 of the disc 13. This arrangement ensures that as the disc 13 rotates, oil is forced from the trough 14 into the intake pipe 16 and is driven therefrom into appropriate oil conduits to pump locations where oil is required.

In the embodiment illustrated in FIGS. 1 and 2, the oil intake pipe 16 is coupled to an oil supply conduit 20 whose opening 20a is oriented towards the location 12 where gears 9 and 11 mesh, to perform there not only the desired lubrication, but principally a gear noise suppression.

Figure 3:
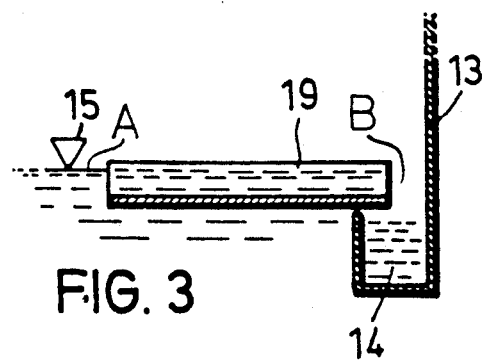
FIG. 3 is a sectional side elevational view of some components of the preferred embodiment.

Also referring to FIG. 3, in case the oil level 15 is selected to be very low such that oil admission into the trough 14 is not always ensured, there is provided an additional stationary feed trough 19 which is arranged at the height of the oil level 15 perpendicularly to the plane in which the disc 13 lies in such a manner that it extends from a location A of the oil level which would only inappreciably be affected by the rotating disc 13, to a zone B which is above (radially inward) of the trough 14.

In the embodiment shown in FIGS. 1, 2 and 3, the oil intake pipe 16 too, is situated in the zone of the oil level 15. Its operative position, however, is independent from the oil level 15; it is only of importance that the opening 17 be disposed within the confines of the trough 14.

FIG. 2 further illustrates an additional feed trough 21 offset at 90° (viewing the stub 7 as the center) from the feed trough 19. The feed trough 21 is operational in case the pump is operated in a 90° counterclockwise offset position relative to the showing in FIG. 2.

Figure 4:
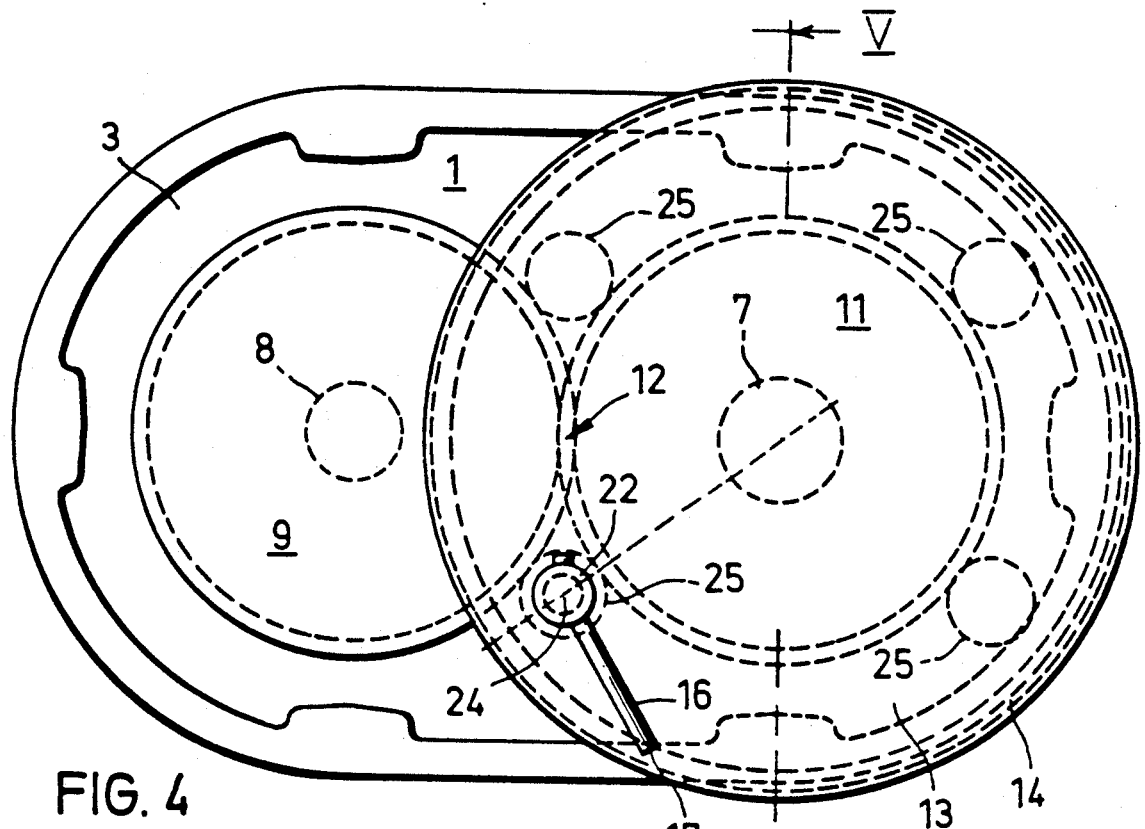
FIG. 4 is a schematic end view of another preferred embodiment of the invention, taken in the direction of the arrow IV of FIG. 5.
Figure 5:
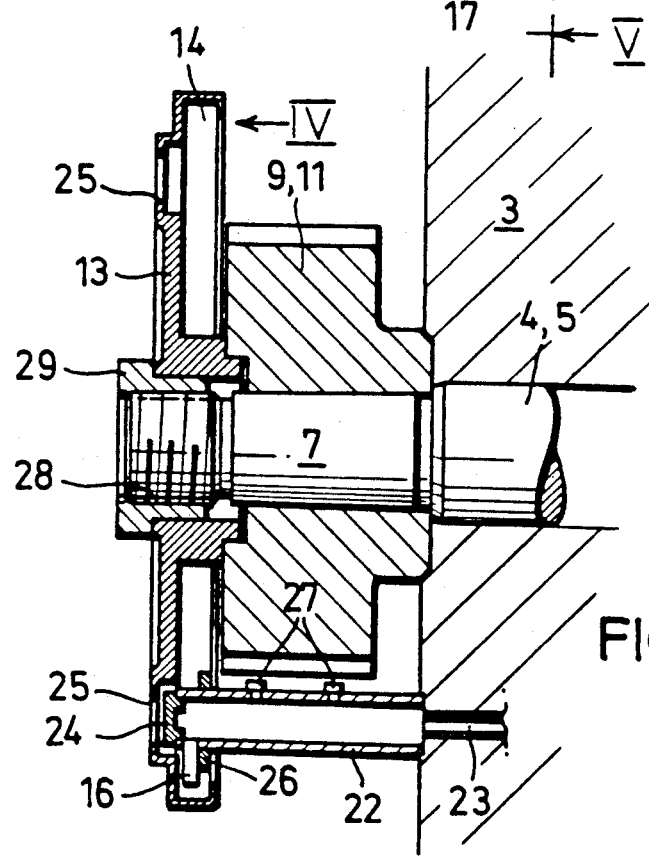
FIG. 5 is a sectional side elevational view taken along line V—V of FIG. 4.

Turning now to the embodiment illustrated in FIGS. 4 and 5, there is provided a coupling pipe 22 which is supported in the pump housing wall 3 and projects, parallel to the shaft stub 7, to a location which is immediately radially inward from the trough 14. The pipe 22 is coupled to an oil conduit 23 provided in the pump wall 3 and may lead to a great variety of locations where pressurized oil is required. The terminus of the coupling pipe 22 at the disc 13 is blocked by a plug or screw 24 which is accessible through an opening 25 provided in the disc 13. Further, in the zone of its terminus, the pipe 22 is coupled to the oil intake pipe 16 which projects into the trough 14. The oil "scooped" into the intake pipe 16 from the trough 14 by virtue of the rotation of the disc 13 is subsequently driven into the coupling pipe 22.

The coupling pipe 22 has, in its zone situated in alignment with the trough 14, an annular disc 26 which deflects oil, stirred up by the intake pipe 16, back into the trough 14. The wall of the coupling pipe 22 is provided with nozzles 27 which are oriented towards the location 12 where gears 9 and 11 mesh to provide oil therefor.

The shaft stub 7 is provided with a thread 28 which receives a sleeve nut 29 to immobilize the disc 13 on the shaft stub 7 as best seen in FIG. 5.

Figure 6:
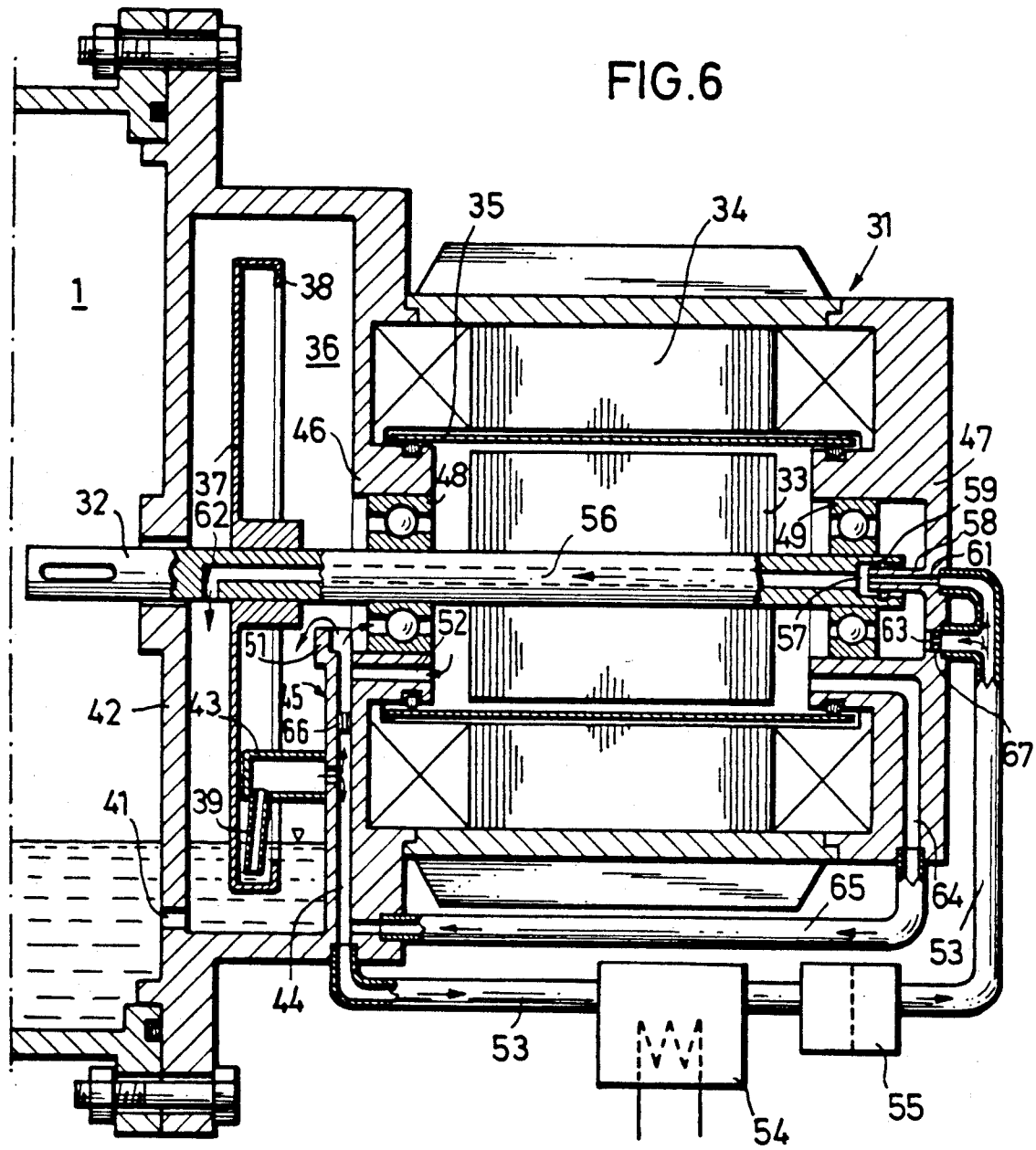
FIG. 6 is a sectional side elevational view of a further preferred embodiment of the invention.

Turning now to FIG. 6, there is shown a motor 31 adapted to drive the vacuum pump 2 illustrated in FIGS. 1 and 2. The motor shaft 32 extends into the gear chamber 1 and is adapted for being torque-transmittingly coupled with the shaft stub 7 of the vacuum pump shaft 4 (neither shown in FIG. 6). The motor 31 has a rotor 33 and a surrounding stator 34 as well as a separator tube 35 which divides the space between the rotor and the stator in a vacuumtight manner. During operation, in the rotor chamber, that is, radially inwardly of the separator tube 35, a vacuum may be maintained: this feature makes this type of motor particularly adapted for driving vacuum pumps.

Within a chamber 36 provided in the motor housing there is provided an oil supply device of the type described in connection with FIGS. 4 and 5. Thus, the oil supply device comprises a disc 37 affixed to the motor shaft 32 and having a peripheral, radially inwardly open trough 38 into which a stationarily supported oil intake pipe 39 extends. The gear chamber 1 and the chamber 36 communicate with one another by means of an opening 41 provided at the bottom of the septum 42 forming part of the motor housing.

In lieu of a separate oil supply device for the drive motor, an oil supply device arranged in the gear chamber 1 may be utilized to lubricate the drive motor 31, for example, either by providing a second standpipe projecting into the trough 14 of the disc 13 or by providing a lubricating conduit which branches off the coupling pipe 22 and leads to the inside of the drive motor 31, for example, by passing through a wall of the motor housing.

In the oil supply device illustrated in FIG. 6 and serving solely the drive motor 31, the oil intake pipe 39 is coupled to a conduit portion 43 which, in turn, is connected with a substantially vertically oriented channel 44 formed b a bore passing through a thickened portion 45 of the bearing wall 46. Bearings 48 and 49 supporting the motor shaft 32 are held in the bearing wall 46 and in the outer end wall 47 of the motor housing. The channel 44 extends upwardly to the zone of the bearing 48 and is provided at that location with an overflow 51, so that part of the lubricant which is not taken up by the bearing 48 returns directly into the chamber 36 also functioning as an oil sump. The lubricant which passes through the bearing 48 returns to the chamber 36 by means of a channel 52 situated underneath the bearing 48 and passing through the bearing wall 46. The channel 52 is offset with respect to the channel 44. The bottom end of the channel 44 is connected to a lubricant conduit 53 which is situated externally of the stator 34 of the drive motor 31 and which is connected to a serially arranged oil cooler 54 and an oil filter 55.

In order to provide for a cooling of the shaft 32 and thus the rotor 33, the shaft 32 is provided with a central channel 56. In the zone of the end wall 47 the shaft 32 has an extension 57 oriented concentrically with respect to the channel 56 and receiving a stationary stub 58 connected with the end wall 47. The stub 58 is provided at its outer end with a sealing ring 59 to ensure that between the stub 58 and the shaft 32 a vacuumtight seal is ensured. The lubricant delivered by the oil filter 55 is guided by a central bore 61 provided in the stub 58 to the shaft 32 and, as it flows through the channel 56, performs its cooling function. In the zone of the chamber 36 the channel 56 terminates in a radial, outwardly open bore 62 to ensure return of the oil to the oil sump.

The conduit 53 is additionally provided with a branch-off port 63 which leads to the bearing 49 to ensure a sufficient lubrication thereof. Excess oil returns into the oil sump through the channel 64 provided in the end wall 47 and the conduit 65.

The oil quantities flowing in the various conduits may be limited by throttles so that a sufficient oil supply for all required locations is ensured. Such throttles are shown in an exemplary manner at 66 and 67 in the channel 44 and the conduit 63.

Figure 7:
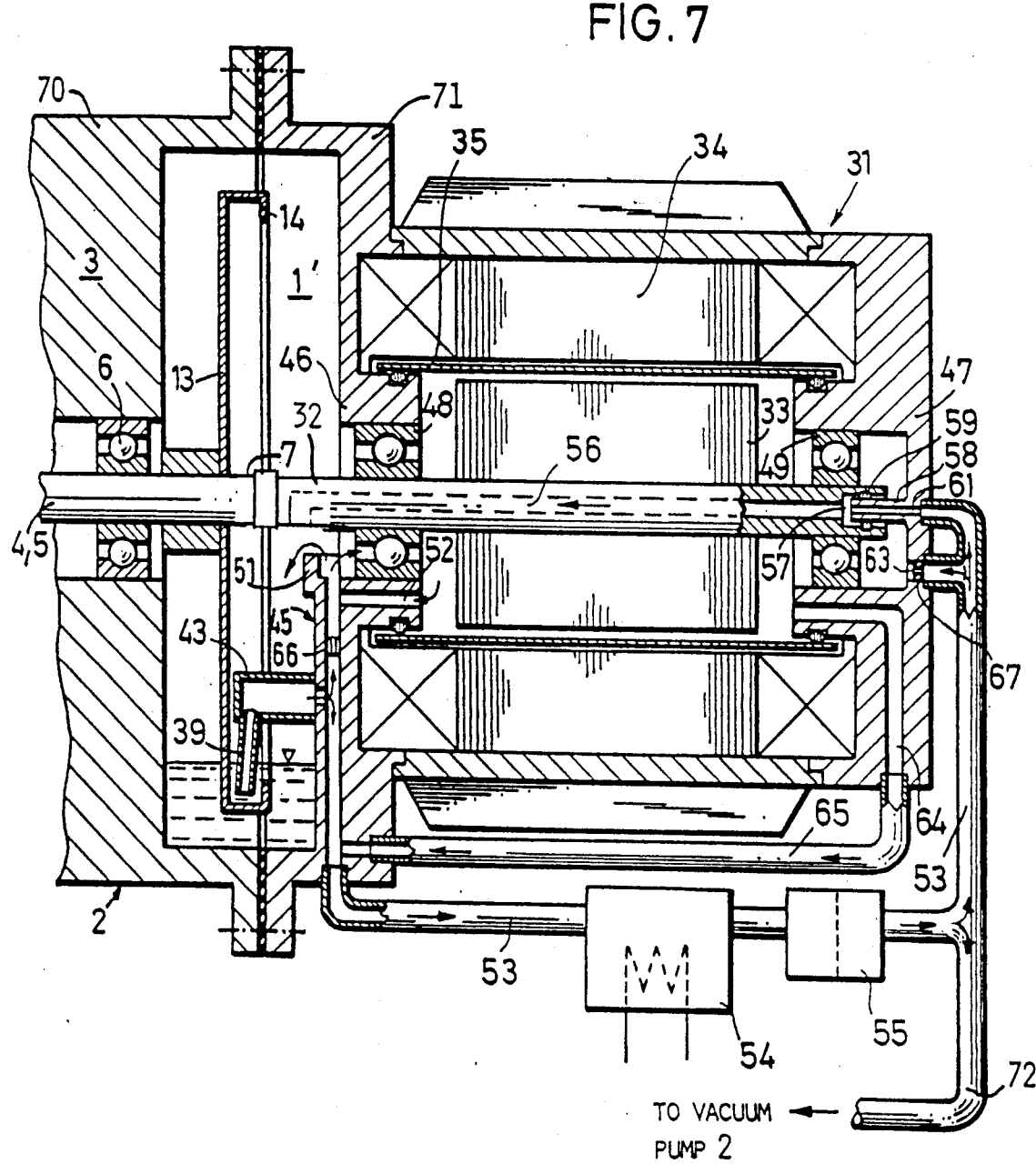
FIG. 7 is a sectional side elevational view of still anther preferred embodiment of the invention.

Turning now to FIG. 7, a single oil supply device is provided to serve both the vacuum pump 2 and the motor 31. A gear chamber 1' is formed jointly by aligned cavities provided in a housing portion 70 of the pump 2 and a housing portion 71 of the motor 31. The motor 31 is supplied with oil with an arrangement identical to that described in connection with FIG. 6, while the vacuum pump 2 receives oil from a branch conduit 72 extending from the conduit 53 at a location downstream of the oil filter 55. The construction and operation of the oil supply device functioning within the confines of the gear chamber 1' is that of the earlier described embodiments, or a combination thereof.

It will be understood that the above description of the present invention is susceptible to various modifications, changes and adaptations, and the same are intended to be comprehended within the meaning and range of equivalents of the appended claims.

What is claimed is:

1. In a Roots vacuum pump having a gear chamber constituting a reservoir adapted to contain oil having a predetermined oil level; a rotary shaft extending into the reservoir; meshing toothed gears situated in said gear chamber and operatively connected with the rotary shaft; and an oil supply device drawing oil from the reservoir for delivering oil to pump components; the improvement in said oil supply device comprising:

(a) a disc affixed to said rotary shaft and having a diameter selected such that a portion of the disc dips at all times into the oil contained in said reservoir;

(b) a trough affixed to said disc for rotation therewith as a unit; said trough extending arcuately and having a radially inwardly open side as viewed relative to said disc; said trough being arranged to be submerged, together with said portion of said disc, at all times partially in the oil contained in said reservoir for filling the trough with oil directly from said reservoir through said radially inwardly open side solely by virtue of submerging the trough in the oil contained in the reservoir; and (c) an oil conduit having a stationarily supported terminal portion accommodated in said reservoir and projecting into said trough and being provided with an open end situated in said trough and oriented opposite an operational rotary direction of said disc, whereby oil is driven into said terminal portion through said open end from said trough upon rotation of said rotary shaft, whereby said oil conduit supplies oil under pressure.

2. A Roots vacuum pump as defined in claim 1, wherein said reservoir has a wall and further wherein said terminal portion is formed of a pipe portion supported in said wall and an intake pipe connected to said pipe portion and projecting into said trough; said open end being provided at a free end of said intake pipe.

3. A roots vacuum pump as defined in claim 2, wherein said pipe portion terminates at said disc at a location spaced radially inwardly form said trough; further comprising a ring surrounding said pipe portion and being affixed thereto; said ring being in alignment with said trough.

4. A Roots vacuum pump as defined in claim 1, said oil conduit leading to at least one location of said vacuum pump for supplying oil under pressure thereto.

5. A roots vacuum pump as defined in claim 4, said oil conduit having a discharge end in a zone where said gears are in a meshing relationship with one another.

6. A roots vacuum pump as defined in claim 4, wherein said gear chamber has a wall and said terminal portion of said oil conduit is formed of a pipe portion supported in said wall and an intake pipe connected to said pipe portion and projecting into said trough; said open end being provided at a free end of said intake pipe; further wherein said pipe portion passes in the vicinity of said gears and comprises, in said vicinity, at least one aperture oriented towards a location where said gears are in a meshing relationship with one another.

7. A roots vacuum pump as defined in claim 4, in further combination with a drive motor externally mounted at said reservoir and having an output shaft connectable to a rotary shaft of said vacuum pump; said housing defining a motor sump for accommodating oil therein; wherein a separate oil supply device is incorporated in said drive motor; said separate oil supply device comprising (a) a disc affixed to said output shaft and being arranged to be submerged at least partially in the oil contained in said motor sump;
(b) a trough affixed to said disc for rotation therewith as a unit; said trough extending arcuately and being radially inwardly open as viewed relative to said disc; said trough being arranged to be submerged at least partially in the oil contained in said motor sump; and
(c) an oil conduit system having a stationarily supported terminal portion accommodated in said motor sump and projecting into said trough and being provided with an open end situated in said trough and oriented opposite an operational rotary direction of said disc, whereby oil is driven into said terminal portion through said open end from said trough upon rotation of said output drive shaft; said oil conduit system leading to components of said motor for supplying said components with pressurized oil from said motor sump.

8. A combination as defined in claim 7, further wherein said motor sump and said reservoir have a common separating wall; further comprising a port provided in said separating wall for maintaining communication of oil between said reservoir and said motor sump.

9. A combination as defined in claim 7, wherein said oil conduit system includes an oil channel; further comprising an oil filter connected in said oil channel.

10. A combination as defined in claim 7, wherein said oil conduit system includes an oil channel; further comprising an oil cooler connected in said oil channel.

11. A combination as defined in claim 7, wherein said oil conduit system comprises a plurality of parallel-extending branch conduits and throttle means situated in at least one of said branch conduits for limiting the flow rate of oil therein.

12. A combination as defined in claim 7, wherein said oil conduit system includes an oil channel extending axially within said output shaft.

13. A combination as defined in claim 7, wherein said drive motor is an electric motor, having a rotor, a stator surrounding said rotor and a stationary separator tube hermetically surrounding said rotor and being surrounded by said stator; said separator tube being radially spaced from said rotor and said stator.

14. A roots vacuum pump as defined in claim 4, in further combination with a drive motor externally mounted at said reservoir and having an output shaft connectable to a rotary shaft of said vacuum pump; said oil conduit constituting an oil conduit system leading to components of said drive motor for supplying said components of said drive motor with pressurized oil from said reservoir.

15. A combination as defined in claim 14, wherein said oil conduit system includes an oil channel; further comprising an oil filter connected in said oil channel.

16. A combination as defined in claim 14, wherein said oil conduit system includes an oil channel; further comprising an oil cooler connected in said oil channel.

17. A combination as defined in claim 14, wherein said oil conduit system comprises a plurality of parallel-extending branch conduits and throttle means situated in at least one of said branch conduits for limiting the flow rate of oil therein.

18. A combination as defined in claim 14, wherein said oil conduit system includes an oil channel extending axially within said output shaft.

19. A combination as defined in claim 14, wherein said drive motor is an electric motor, having a rotor, a stator surrounding said rotor and a stationary separator tube hermetically surrounding said rotor and being surrounded by said stator; said separator tube being radially spaced from said rotor and said stator.

* * * * *